（12） United States Patent
Kuji

(10) Patent No.: US 11,520,402 B2
(45) Date of Patent: Dec. 6, 2022

(54) CONTROL APPARATUS FOR CONTROLLER DEVICE

(71) Applicant: SONY INTERACTIVE ENTERTAINMENT INC., Tokyo (JP)

(72) Inventor: Takuya Kuji, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 17/283,586

(22) PCT Filed: Oct. 19, 2018

(86) PCT No.: PCT/JP2018/039094
§ 371 (c)(1),
(2) Date: Apr. 8, 2021

(87) PCT Pub. No.: WO2020/079852
PCT Pub. Date: Apr. 23, 2020

(65) Prior Publication Data
US 2021/0342003 A1 Nov. 4, 2021

(51) Int. Cl.
G06F 3/01 (2006.01)
(52) U.S. Cl.
CPC .................. G06F 3/014 (2013.01)
(58) Field of Classification Search
CPC ....................................... G06F 3/014
See application file for complete search history.

(56) References Cited

U.S. PATENT DOCUMENTS

2018/0264357 A1* 9/2018 Dalton .................. A63F 13/214
2020/0089320 A1* 3/2020 Bae ........................... G01L 1/20

FOREIGN PATENT DOCUMENTS

| JP | 2014-60482 A | 4/2014 |
|----|--------------|--------|
| WO | 2009/020204 A1 | 2/2009 |
| WO | 2017/150128 A1 | 9/2017 |
| WO | 2018/079382 A1 | 5/2018 |
| WO | 2018/150914 A1 | 8/2018 |

OTHER PUBLICATIONS

International Preliminary Report on Patentability dated Apr. 14, 2021, from PCT/JP2018/039094, 23 sheets.
International Search Report and Written Opinion dated Dec. 18, 2018, from PCT/JP2018/039094, 17 sheets.

* cited by examiner

Primary Examiner — Towfiq Elahi
(74) Attorney, Agent, or Firm — Katten Muchin Rosenman LLP

(57) ABSTRACT

A control apparatus controls the controller device that is mounted on a hand of a user and includes a plurality of sensors exceeding the number of fingers of the user to be detected so as to detect bending and stretching of the fingers to be detected. The control apparatus identifies a width of the hand of the user, determines, on the basis of information regarding the identified width of the hand, to which sensor among the plurality of sensors each of the fingers to be detected is assigned, and uses an output of the sensor assigned to each of the fingers to be detected to identify and output a state of bending and stretching of the corresponding finger.

4 Claims, 10 Drawing Sheets

FIG.5

| INDEX FINGER | LITTLE FINGER | MIDDLE FINGER | RING FINGER |
|---|---|---|---|
| 33-1 | 33-4 | 33-2 | 33-3 |
| | 33-5 | 33-3 | 33-4 |
| | 33-6 | 33-3 | 33-5 |
| | 33-7 | 33-3 | 33-5 |
| | 33-8 | 33-4 | 33-6 |
| | 33-9 | 33-4 | 33-7 |
| | 33-10 | 33-4 | 33-7 |
| | 33-11 | 33-5 | 33-8 |
| | 33-12 | 33-5 | 33-9 |
| 33-6 | 33-4 | 33-3 | 33-4 |
| | 33-5 | 33-4 | 33-5 |
| | 33-6 | 33-4 | 33-6 |
| | 33-7 | 33-4 | 33-6 |
| | 33-8 | 33-5 | 33-7 |
| | 33-9 | 33-5 | 33-8 |
| | 33-10 | 33-5 | 33-8 |
| | 33-11 | 33-6 | 33-9 |
| | 33-12 | 33-6 | 33-9 |

|  | INDEX FINGER | RING FINGER | LITTLE FINGER |
|---|---|---|---|
| MAXIMUM ROTATION ANGLE | −10.0 | 10.0 | 20.0 |
| ROTATION AMOUNT | −1.0 | 1.0 | 2.0 |

CONTROL APPARATUS FOR CONTROLLER DEVICE

TECHNICAL FIELD

The present invention relates to a control apparatus, a control method, and a program for controlling a controller device.

BACKGROUND ART

For example, in a technology such as virtual reality, an operation input from a user is received by gesture such as a movement of a finger, in some cases. As one of technologies for recognizing the movement of the finger of the user, a method in which a controller device is mounted on a hand of the user, and a state of the finger of the user is detected by a sensor provided on a surface of the controller device has been investigated.

SUMMARY

Technical Problem

Different users who use the controller device have hands different in size. Therefore, if a size of a hand of a user who is actually mounted with the controller device is deviated from a size of a hand supposed for the controller device, it is difficult to accurately detect a state of a finger of the user is difficult.

The present invention has been made in consideration of the above situation, and one of objects thereof is to provide a control apparatus, a control method, and a program for a controller device, capable of accurately detecting a state of a finger regardless of a size of a hand of a user.

Solution to Problem

A control apparatus for a controller device according to an aspect of the present invention is a control apparatus for controlling a controller device that is mounted on a hand of a user and includes a plurality of sensors exceeding the number of fingers of the user to be detected so as to detect bending and stretching of the fingers to be detected, the control apparatus including a width identification unit that identifies a width of the hand of the user, an assignment determination unit that determines, on the basis of information regarding the identified width of the hand, to which sensor among the plurality of sensors each of the fingers to be detected is assigned, and a state identification unit that uses an output of the sensor assigned to each of the fingers to be detected to identify and output a state of bending and stretching of the corresponding finger.

A control apparatus for a controller device according to another aspect of the present invention is a control apparatus for controlling a controller device that is mounted on a hand of a user and includes a plurality of first sensors that detect a state of a finger of the user and a second sensor that detects the hand of the user in a state in which the user is mounted with the controller device, the control apparatus including a determination unit that determines whether or not the controller device is mounted on the hand of the user according to a result of detection by the second sensor, and a control unit that stops operation of the plurality of first sensors in a case where the determination determines that the controller device is not mounted on the hand of the user.

Further, a controller device according to an aspect of the present invention is a controller device that is mounted on a hand of a user and includes a plurality of first sensors that detect a state of a finger of the user, a second sensor that detects the hand of the user in a state in which the user is mounted with the controller device, and a fixture that fixes the controller device to the hand of the user. The second sensor is disposed so as to define a detection range thereof on an inner side of the fixture.

A control method for a controller device according to an aspect of the present invention is a control method for controlling a controller device that is mounted on a hand of a user and includes a plurality of sensors exceeding the number of fingers of the user to be detected so as to detect bending and stretching of the fingers to be detected, the control method including a step of identifying a width of the hand of the user, a step of determining, on the basis of information regarding the identified width of the hand, to which sensor among the plurality of sensors each of the fingers to be detected is assigned, and a step of using an output of the sensor assigned to each of the fingers to be detected to identify and output a state of bending and stretching of the corresponding finger.

A program according to an aspect of the present invention is a program for controlling a controller device that is mounted on a hand of a user and includes a plurality of sensors exceeding the number of fingers of the user to be detected so as to detect bending and stretching of the fingers to be detected, the program causing a computer to execute a step of identifying a width of the hand of the user, a step of determining, on the basis of information regarding the identified width of the hand, to which sensor among the plurality of sensors each of the fingers to be detected is assigned, and a step of using an output of the sensor assigned to each of the fingers to be detected to identify and output a state of bending and stretching of the corresponding finger. The program may be provided while being stored in a computer-readable non-transitory information storage medium.

BRIEF DESCRIPTION OF DRAWINGS

FIG. 5 is a diagram illustrating an example of a correspondence table of proximity sensors.

DESCRIPTION OF EMBODIMENT

Hereinafter, an exemplary embodiment according to the present invention will be described in detail with reference to the drawings.

Figure 1:
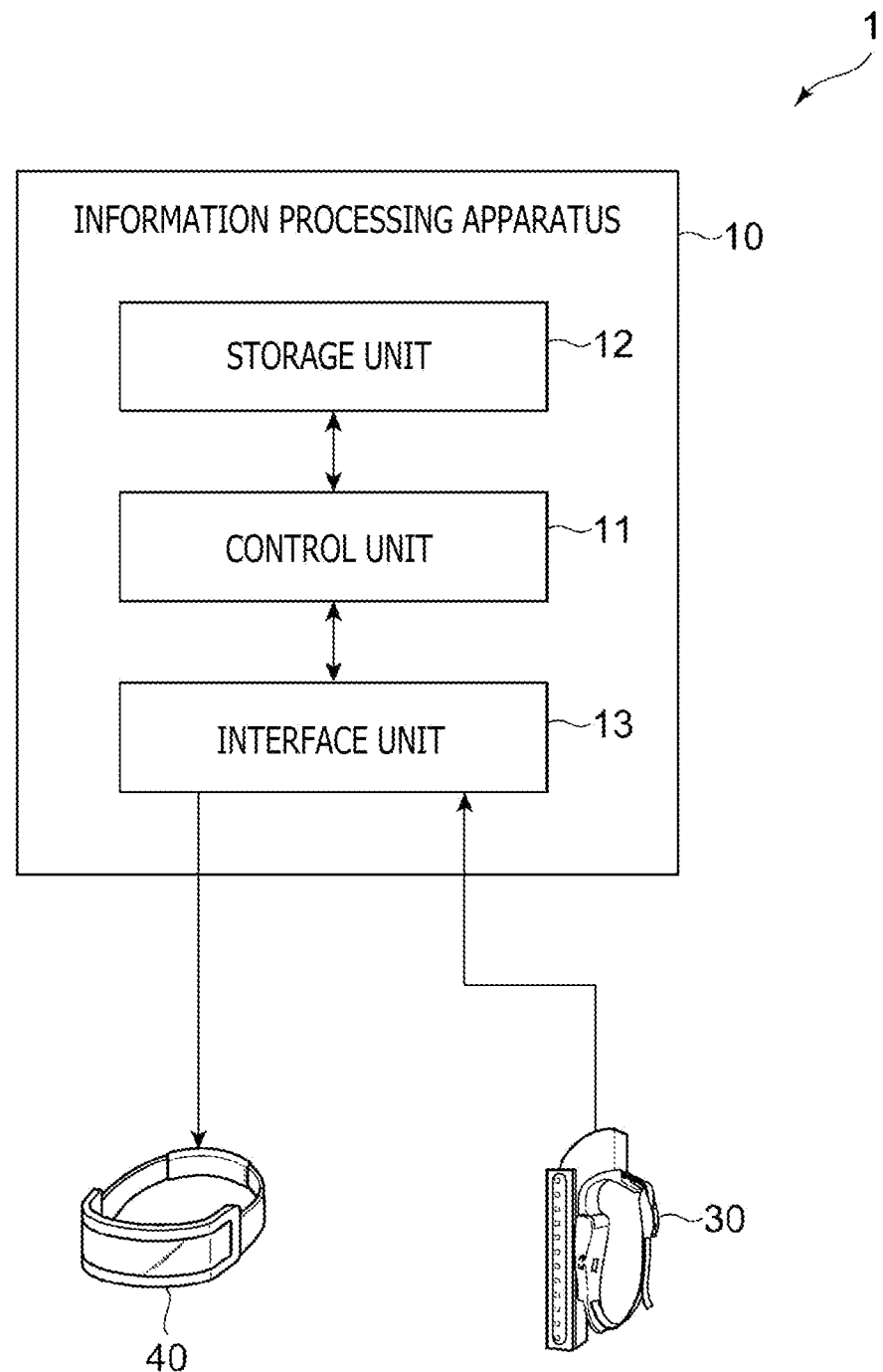
FIG. 1 is a block diagram of a configuration of an information processing system including a control apparatus according to an exemplary embodiment of the present invention.

FIG. 1 is a block diagram of a configuration of a general outline of an information processing system 1 including a control apparatus according to the exemplary embodiment of the present invention. As illustrated in FIG. 1, the information processing system 1 includes an information processing apparatus 10, a controller device 30, and a head mounted display device 40. In the present exemplary embodiment, the information processing apparatus 10 functions as a control apparatus that controls the controller device 30.

The information processing apparatus 10 is an apparatus that processes a result of detection by the controller device 30 and may be a home-use game machine, a portable game machine, a personal computer, a smartphone, or a tablet, for example. As illustrated in FIG. 1, the information processing apparatus 10 includes a control unit 11, a storage unit 12, and an interface unit 13.

The control unit 11 includes at least one processor such as a CPU (Central Processing Unit) and executes a program stored in the storage unit 12 to execute various information processes. Note that specific examples of the processes executed by the control unit 11 in the present exemplary embodiment will be described later. The storage unit 12 includes at least one memory device such as a RAM (Random Access Memory) and stores a program to be executed by the control unit 11 and data to be processed by the program.

The interface unit 13 is an interface for data communication with the controller device 30 and the display device 40. The information processing apparatus 10 is connected to each of the controller device 30 and the display device 40 through the interface unit 13 in a wired or wireless manner. Specifically, the interface unit 13 is assumed to include a multimedia interface such as HDMI (High-Definition Multimedia Interface) (registered trademark) for transmitting video data supplied from the information processing apparatus 10 to the display device 40. Further, the interface unit 13 includes a data communication interface such as USB (Universal Serial Bus) for receiving a signal indicating a result of detection by the controller device 30.

Figure 2:
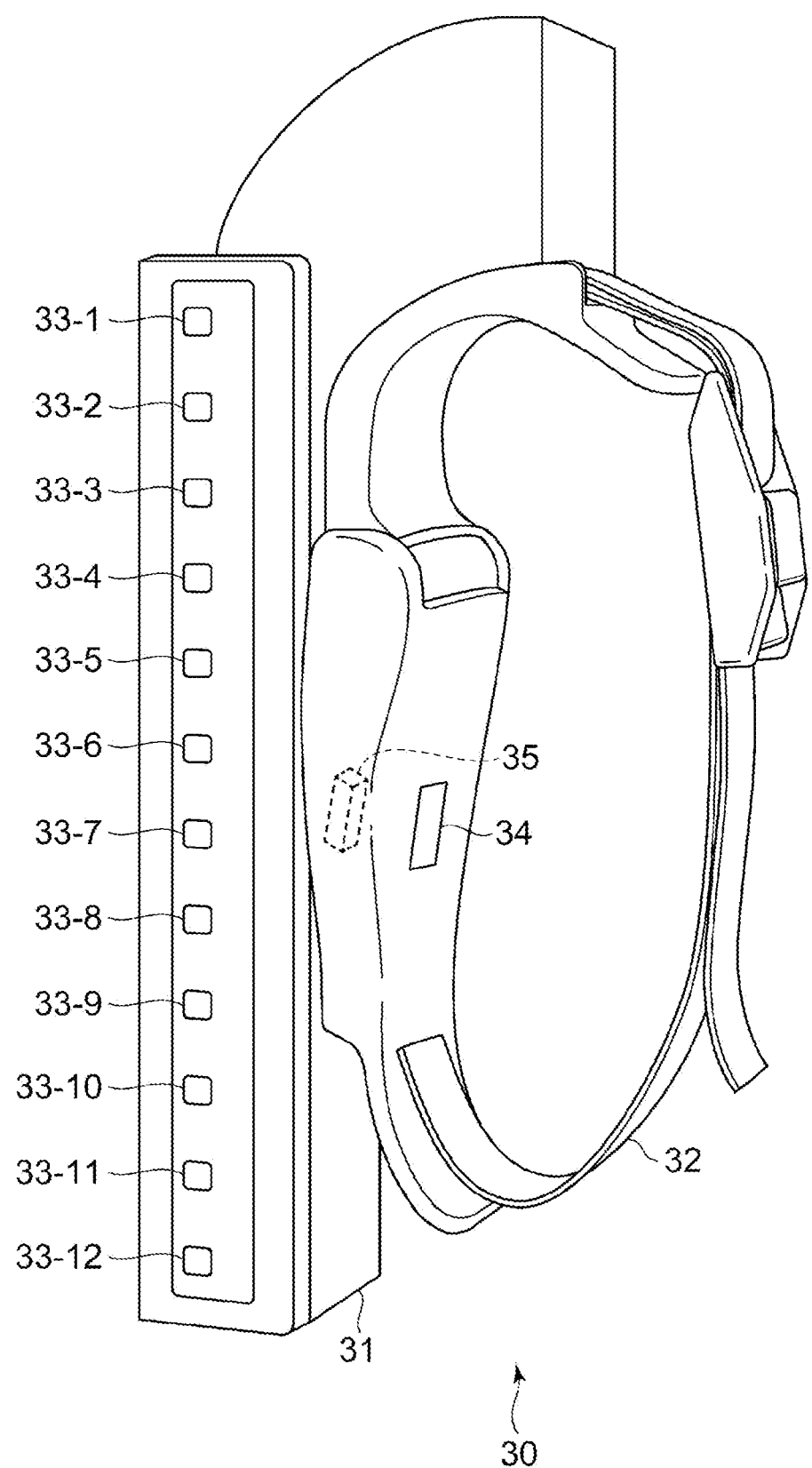
FIG. 2 is a diagram illustrating an example of an external appearance of a controller device.

The controller device 30 is a device that is mounted on a hand of a user and is used to detect movements of fingers of the user. FIG. 2 illustrates an example of an external appearance of the controller device 30. In the example of FIG. 2, the controller device 30 includes a main body 31 and a fixture 32, and the user has his or her palm pass through the fixture 32 to mount the controller device 30 on the hand. Note that the fixture 32 may include, for example, a belt whose length is adjustable according to a size of the hand of the user.

On a surface of a housing of the main body 31, a plurality of proximity sensors 33 are disposed to detect movements of fingers of the user. Each proximity sensor 33 is a sensor that can measure a distance to an object present within a detection range, such as an infrared sensor or an electrostatic capacitance sensor. The information processing apparatus 10 identifies a position of each finger of the user to be detected, by use of results of detection by the proximity sensors 33. In the present exemplary embodiment, the fingers to be detected by the proximity sensors 33 are assumed to be four fingers that are an index finger, a middle finger, a ring finger, and a little finger excluding a thumb of the user's hand mounted with the controller device 30. Note that it is assumed here that the controller device 30 is mounted on either one of the hands of the user, but the controller device 30 may be mounted on both of the right and left hands of the user.

The number of the proximity sensors 33 disposed on the surface of the controller device 30 is more than the number of the fingers to be detected (more than four). Specifically, the proximity sensors 33 are disposed in line along a longitudinal direction of the main body 31 (in other words, along a width direction of the palm of the user) at positions facing the fingers to be detected in a state in which the user is mounted with the controller device 30. The number and disposition intervals of the proximity sensors 33 to be disposed are determined such that a detection range covered by the plurality of proximity sensors 33 disposed in line as a whole is a range exceeding a width of the palm of the user. In the present exemplary embodiment, it is assumed that 12 proximity sensors 33 in total are disposed in line at equal intervals as illustrated in FIG. 2. Hereinafter, a longitudinal direction of the controller device 30 is defined as a Y-axis direction, a direction toward the index finger of the user is defined as a positive Y-axis direction, and a direction toward the little finger of the user is defined as a negative Y-axis direction. The 12 proximity sensors 33 are disposed in line on a straight line along the Y-axis direction. Further, hereinafter, the 12 proximity sensors 33 are denoted as proximity sensors 33-1 to 33-12 in order from the positive Y-axis direction side toward the negative Y-axis direction side.

A mount sensor 34 for detecting a state in which the user is mounted with the controller device 30 is disposed at a position different from the positions of the proximity sensors 33 in the controller device 30. The mount sensor 34 may be a proximity sensor of the same type as the proximity sensors 33 or may be a sensor of a different type that detects presence of a human body, such as a temperature sensor. The mount sensor 34 is disposed at a position where the mount sensor 34 can detect presence of the hand mounted with the controller device 30 when the user is mounted with the controller device 30. In the present exemplary embodiment, the mount sensor 34 is disposed so as to have its detection range set in a direction toward the fixture 32. With this configuration, when the user has the palm pass through the fixture 32, the mount sensor 34 can reliably detect presence of the palm of the user. On the other hand, it is possible to suppress erroneous detection of an object other than the user's hand when the user is not mounted with the controller device 30, for example, when the controller device 30 is placed on a desk.

The controller device 30 further has a control circuit 35 incorporated therein. The control circuit 35 transmits a signal indicating details of the result of detection by each of the plurality of proximity sensors 33 to the information processing apparatus 10. The control circuit 35 also controls operation states of the proximity sensors 33.

The display device 40 is a video display device used while being mounted on a head of the user and displays a video according to a video signal transmitted from the information processing apparatus 10 to allow the user to view the video.

Figure 3:
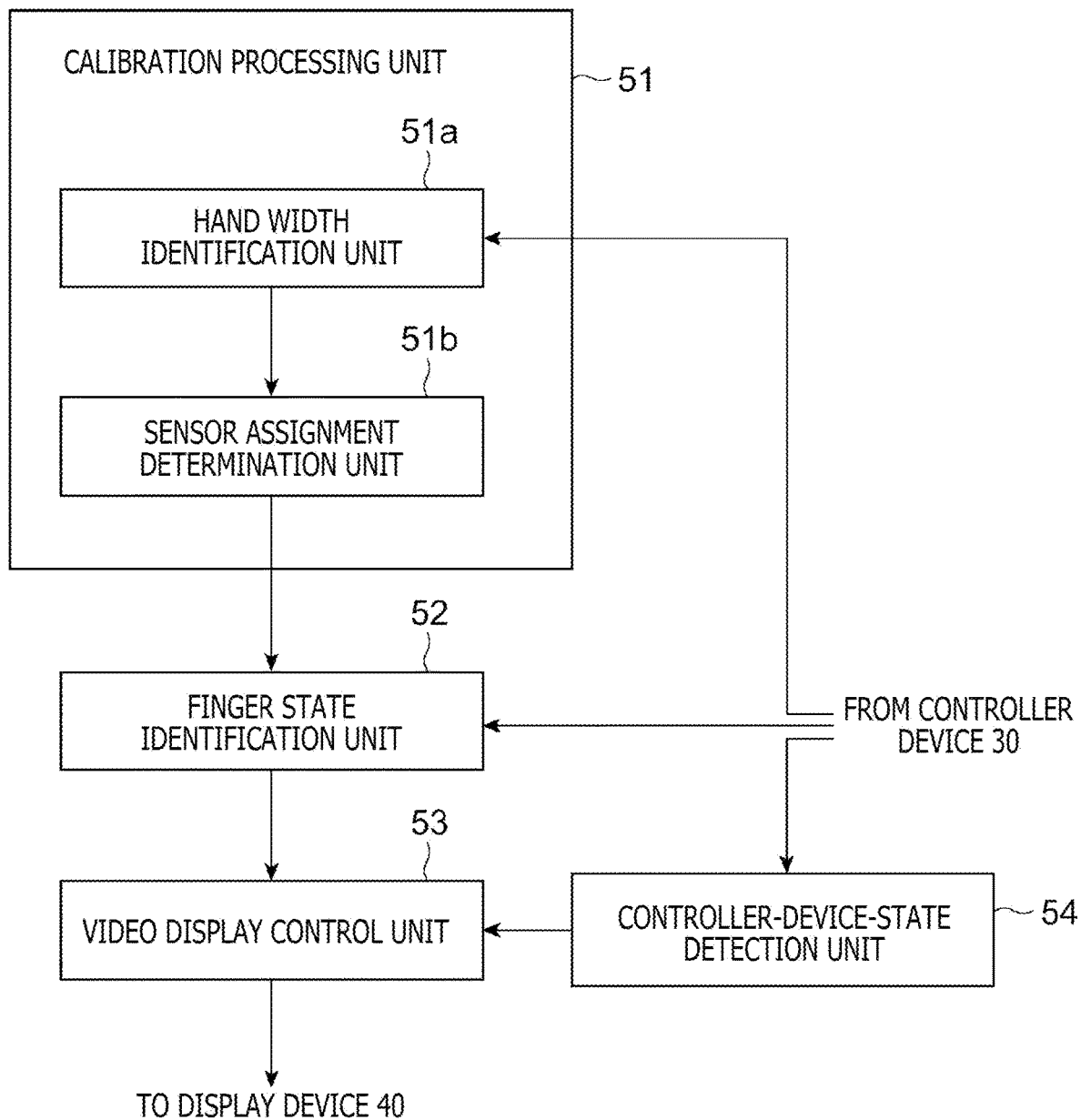
FIG. 3 is a functional block diagram of an information processing apparatus.

Next, functions implemented by the information processing apparatus 10 will be described with reference to FIG. 3. The information processing apparatus 10 functionally includes a calibration processing unit 51, a finger state identification unit 52, a video display control unit 53, and a controller-device-state detection unit 54, as illustrated in FIG. 3. Further, the calibration processing unit 51 includes a hand width identification unit 51a and a sensor assignment determination unit 51b. These functions are implemented by the control unit 11 executing a program stored in the storage unit 12. The program may be provided to the information processing apparatus 10 via a communication network such as the Internet or may be provided while being stored in a computer-readable information storage medium such as an optical disc.

The calibration processing unit 51 executes a calibration process at a timing when the user starts using the controller device 30 or at a timing instructed by the user, for example. The calibration process here is a process in which, for each of the user's fingers to be detected, a proximity sensor 33 to be used for identifying a state of the finger is selected from among the plurality of proximity sensors 33.

The hand width identification unit 51a identifies a range corresponding to the width of the hand in the state in which the user is mounted with the controller device 30. The size of a hand and the way of mounting the controller device 30 differ from person to person. Therefore, it is not obvious in advance at what position each finger to be detected is to be present in the state in which the user is mounted with the controller device 30. To cope with the problem, in the present exemplary embodiment, the hand width identification unit 51a identifies a range over which the user's hand is actually present in the state in which the user is mounted with the controller device 30. Then, the sensor assignment determination unit 51b determines the proximity sensor 33 corresponding to each of the fingers to be detected on the basis of a result of the identification by the hand width identification unit 51a.

More specifically, the hand width identification unit 51a identifies positions of the fingers present at both ends in the width direction of the user's hand (in other words, the index finger and the little finger) among the fingers of the hand in the state in which the user is mounted with the controller device 30. The range from the index finger to the little finger corresponds to the width of the user's hand. For example, in executing the calibration process, the hand width identification unit 51a outputs a message for prompting the user to grip the main body 31 of the controller device 30. In a state in which the user grips the main body 31 of the controller device 30 with his or her hand in response to the message, the hand width identification unit 51a obtains an output of each proximity sensor 33. In this state, among the proximity sensors 33 that have detected presence of an object at a distance shorter than a predetermined distance, the proximity sensor 33 located on the most positive Y-axis direction side is estimated to correspond to the position of the index finger of the user. Similarly, among the proximity sensors 33 that have detected presence of an object, the proximity sensor 33 located on the most negative Y-axis direction side is estimated to correspond to the position of the little finger of the user.

Note that the hand width identification unit 51a may identify the proximity sensors 33 corresponding to both ends of the user's hand on the basis of the values detected by a plurality of adjacent proximity sensors 33, without simply determining that the proximity sensors 33 at both ends, which have detected an object at a distance shorter than a predetermined distance, correspond to both ends of the user's hand. As a specific example, the proximity sensor 33 whose detection value upon calibration is equal to or more than a predetermined first threshold and that is located on the most negative Y-axis direction side is first identified as an attention sensor. Then, when a value detected by the proximity sensor 33 disposed adjacent to the attention sensor on the negative Y-axis direction side exceeds a second threshold smaller than the first threshold, the attention sensor is identified as the proximity sensor 33 corresponding to the little finger. On the other hand, when the value detected by the proximity sensor 33 adjacent to the attention sensor is equal to or less than the second threshold, the proximity sensor 33 disposed next to the attention sensor on the positive Y-axis direction side is identified as the proximity sensor 33 corresponding to the little finger. With respect to the proximity sensors 33 possibly corresponding to the index finger, values are calculated by adding a correction value predetermined according to the position of each of the proximity sensors 33 to its detection value. The proximity sensor 33 having the largest calculated value is identified as the proximity sensor 33 corresponding to the index finger. By taking the values detected by the plurality of adjacent proximity sensors 33 into account in this manner, it is possible to estimate the positions where the index finger and the little finger are to be present more accurately. Note that it is assumed here that, the larger the detection value is, the closer to the proximity sensor 33 a finger of the user is detected.

Figure 4:
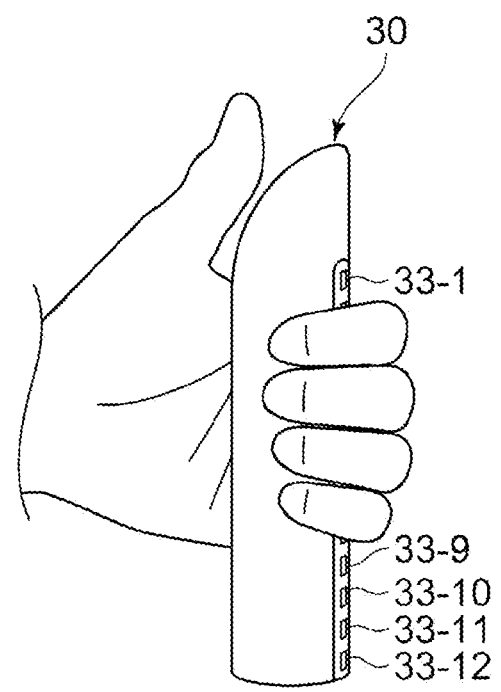
FIG. 4 is a diagram illustrating an example of a state of a hand of a user upon executing calibration.

FIG. 4 illustrates an example of a state of the user's hand that is mounted with the controller device 30 upon executing the calibration. In the example of FIG. 4, it is assumed that, in a state in which the user grips the main body 31 of the controller device 30, the proximity sensors 33-2 to 33-8 detect the user's fingers and output relatively large detection values. In this case, the hand width identification unit 51a determines that the proximity sensors 33-2 and 33-8 respectively correspond to the index finger and the little finger of the user. In other words, the user's hand is identified to be present in a range from the position of the proximity sensor 33-2 to the position of the proximity sensor 33-8.

The sensor assignment determination unit 51b determines sensors used to detect the positions of the fingers to be detected, from among the plurality of proximity sensors 33, on the basis of the result of identification by the hand width identification unit 51a. In other words, the proximity sensors 33 assigned to the respective fingers to be detected are determined.

Specifically, the sensor assignment determination unit 51b determines the proximity sensors 33 identified, by the hand width identification unit 51a, to correspond to the index finger and the little finger as the proximity sensors 33 to be assigned to those fingers. With respect to the middle finger and the ring finger, the sensor assignment determination unit 51b refers to a correspondence table of the proximity sensors 33, which is stored in the storage unit 12 in advance, and reads correspondence information associated with the proximity sensors 33 assigned to the index finger and the little finger. The sensor assignment determination unit 51b then determines assignment for each finger according to the correspondence information.

FIG. 5 illustrates an example of the correspondence table of the proximity sensors 33 in this example. In the example of FIG. 5, it is assumed that the index finger of the user corresponds to either one of the proximity sensors 33-1 and 33-2 and the little finger corresponds to any one of the proximity sensors 33-4 to 33-12. In the correspondence table, correspondence information of the proximity sensors 33 corresponding to the middle finger and the ring finger is stored such that intervals between the fingers are substantially constant from the index finger to the little finger. The sensor assignment determination unit 51b determines, in the correspondence table, the respective proximity sensors 33 to be assigned to the middle finger and the ring finger on the basis of the results of identification of the positions of the index finger and the little finger by the hand width identification unit 51a. For example, in a case where the index finger and the little finger are identified to respectively correspond to the proximity sensors 33-2 and 33-8, the sensor assignment determination unit 51b assigns the proximity sensors 33-5 and 33-7 to the middle finger and the ring finger, respectively.

Note that the correspondence table may be determined by having a plurality of users having hands of various sizes use the controller device 30 in advance, and sampling results of detection by the proximity sensors 33 at that time.

In the above description, the calibration processing unit 51 executes the calibration process at a specific timing, for example, the timing when the user starts using the controller device 30. However, the present invention is not limited to this case, and the calibration processing unit 51 may automatically execute the calibration process during a period in which the user is using the controller device 30. Specifically, the calibration processing unit 51 monitors the results of detection by the proximity sensors 33 during the period in which the controller device 30 is being used. In a case where a certain proximity sensor 33 detects a value equal to or larger than a predetermined threshold a predetermined number of times or more, the calibration processing unit 51 determines that a finger of the user's hand is present at the position of the proximity sensor 33. By executing such determination with respect to each of the proximity sensors 33, the hand width identification unit 51a can identify the width of the user's hand without having the user intentionally perform an operation of gripping the controller device 30 for the calibration.

The finger state identification unit 52 identifies a state of bending and stretching of each of the user's fingers to be detected by use of the results of detection by the proximity sensors 33. Here, on the basis of the result of detection by the proximity sensor 33 assigned to each of the fingers to be detected by the calibration processing unit 51, the finger state identification unit 52 determines the state of bending and stretching of the corresponding finger, that is, a degree to which the user is bending the finger.

For example, in a case where the calibration processing unit 51 assigns the proximity sensor 33-7 to the ring finger, the finger state identification unit 52 converts the value detected by the proximity sensor 33-7 according to a given conversion table to identify a bending amount of the ring finger of the user. Similarly, with respect to each of the other fingers to be detected, a bending amount of the finger is identified on the basis of the value detected by the corresponding proximity sensor 33. The bending amount here is a value indicating a degree to which the finger is bent in a direction in which a tip of the finger approaches the palm from a state in which the palm is opened with the finger straightly stretched.

Since the result of detection by the proximity sensor 33 corresponds to the distance to an object to be detected, it is estimated that, in a case where the detected distance is large, the finger is stretched by the user, and in a case where the detected distance is small, the finger is bent. The conversion table indicating a correspondence relation between the detection value of the proximity sensor 33 and the bending amount of the finger by the user is assumed to be stored in the storage unit 12 on the basis of a result of actual measurement performed in advance.

Note that, when determining the degrees to which the user is bending the fingers by use of the results of detection by the respective proximity sensors 33, the finger state identification unit 52 may use information regarding the width of the hand identified by the hand width identification unit 51a. In general, there is a tendency in which a person having a hand with a large width has long fingers, and a person having a hand with a small width has short fingers. Depending on the lengths of the fingers, the results of detection by the proximity sensors 33 vary even when the fingers are bent at the same degree. Specifically, it is estimated that, the shorter the length of the finger of the person, the smaller the distance to the proximity sensor 33 even with a small bending amount of the finger. Therefore, the finger state identification unit 52 corrects a numerical value of the bending amount of each finger determined on the basis of the result of detection by the proximity sensor 33 corresponding to the finger, according to the width of the user's hand. Alternatively, a plurality of conversion tables may be prepared in advance according to the identification result of the width of the hand. In this case, the finger state identification unit 52 refers to the result of identification by the hand width identification unit 51a to determine a conversion table to be used, and converts the value detected by the corresponding proximity sensor 33 into the bending amount of the finger according to the conversion table.

Figures 6, 7:
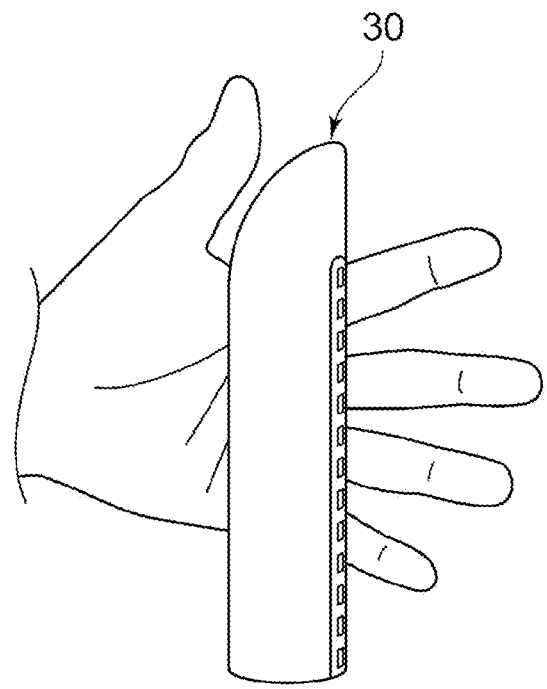
FIG. 6 is a diagram illustrating a state in which the user opens his or her fingers.
FIG. 7 is a diagram illustrating an example of a table defining rotation angles of the fingers of the user.

Alternatively, the finger state identification unit 52 may determine opening degrees of the fingers of the user by use of the results of detection by the proximity sensors 33. As illustrated in FIG. 4, upon executing the calibration process, the user holds the controller device 30 so as to grip it by his or her hand. Therefore, the fingers to be detected are closed, and intervals between the fingers are small. In contrast, during a period in which the controller device 30 is being used, as illustrated in FIG. 6, the user may open his or her hand such that the fingers are apart from each other. At this time, a finger on an end of the hand such as the little finger rotates in a lateral direction (a direction intersecting a bending and stretching direction of the fingers) with respect to the palm, with a root part of the finger as a rotation center. As a result, the finger on the end of the hand approaches a proximity sensor 33 disposed on an outer side of the proximity sensor 33 assigned thereto by the sensor assignment determination unit 51b. Therefore, the finger state identification unit 52 determines the opening degrees of the fingers of the user by use of the result of detection by another proximity sensor 33 different from the proximity sensor 33 assigned by the sensor assignment determination unit 51b.

Specifically, the finger state identification unit 52 determines the opening degrees of the fingers on the basis of the result of detection by a predetermined proximity sensor 33 disposed on the outer side (on the negative Y-axis direction side) of the proximity sensor 33 assigned to the little finger by the calibration processing unit 51. For example, in a case in which the proximity sensor 33 assigned to the little finger is the proximity sensor 33-8, when the user does not open the fingers, during the period in which the controller device 30 is being used, the proximity sensors 33-9 to 33-12 should detect no object, or should detect that an object (little finger) is present at a position farther than the proximity sensor 33-8. In contrast, in a case where the user opens the fingers and rotates the little finger in a direction opposite to the index finger, it is assumed that the proximity sensor 33-9 and the proximity sensor 33-10 disposed on the outer side of the proximity sensor 33-8 assigned to the little finger detect presence of an object at a position closer than in the case in which the fingers are not opened. Then, the finger state identification unit 52 can estimate the opening degrees of the fingers of the user by use of the result of detection by the proximity sensor 33 (e.g., proximity sensor 33-10) located on the outer side of the proximity sensor 33 assigned to the little finger in this manner.

As a more specific example, in a case where the value detected by the proximity sensor 33 assigned to the little finger is x1 and the value detected by the proximity sensor 33 that is a second one on the outer side (on the negative Y-axis direction side) from the proximity sensor 33 assigned to the little finger is x2, the finger state identification unit 52 may calculate a rotation angle θ of the little finger by the following calculation formula.

$$θ=θmax·x2/(x1+x2)$$

Here, θmax is a value of a maximum rotation angle of the little finger, which is defined in advance. It is assumed that, when x2 becomes larger with respect to x1, the little finger is opened more to an outer side. Therefore, as indicated in the calculation formula, by multiplying the ratio of x2 to (x1+x2) by the maximum value of the rotation angle, the rotation angle of the little finger can be calculated in a range from 0 to θmax.

Note that how much each finger rotates at most when a person opens his or her fingers and how the fingers are associated with each other in rotating may be defined in advance. Specifically, it is assumed here that the user opens four fingers such that the four fingers rotate in association with each other. In a case where the user tries to open the fingers, it is estimated that the little finger rotates to the outer side (a side opposite to the index finger), and the ring finger also rotates in the same direction with a rotation amount less than that of the little finger, but the index finger rotates in a direction opposite to the direction in which the little finger and the ring finger rotate (a side opposite to the little finger). Note that, here, the middle finger is assumed not to rotate when the user opens his or her hand. By use of the definition information defining the rotation directions and the rotation amounts as described above, and the information regarding the rotation angle of the little finger identified from the result of detection by the proximity sensor 33, the finger state identification unit 52 can also calculate opening states (rotation amounts) of the fingers other than the little finger. FIG. 7 illustrates an example of the maximum value of the rotation angle of each finger and a ratio of the rotation amounts as described above.

The video display control unit 53 draws a video to be presented to the user and outputs the video to the display device 40. In the present exemplary embodiment, the video display control unit 53 is assumed to draw a video indicating a state in a virtual space in which various objects are disposed. In particular, the video display control unit 53 is assumed to dispose a hand object that changes in conjunction with the states of bending and stretching of the fingers of the user which states are identified by the finger state identification unit 52, in the virtual space, and draw a state of the hand object. With this configuration, when the user performs an operation for bending, stretching, or opening the fingers of his or her hand mounted with the controller device 30, the hand object in the virtual space can be operated in the same manner as the movement of the fingers.

Therefore, the user can obtain an experience as if the user directly touches or grabs another object in the virtual space by his or her hand.

Note that, in a case where each finger configuring the hand object is to be changed into a state (target state) identified by the finger state identification unit 52, the finger may gradually be changed while suppressing the rotation amount or a movement amount of the finger per unit time to equal to or less than a predetermined amount, without instantaneously changing the finger into the target state. This can suppress a sense of incongruity in movements of the finger in the video that is presented to the user by the video display control unit 53, and thus, the hand object is naturally changed.

The controller-device-state detection unit 54 detects a state of the controller device 30 and performs various types of control according to the detection result. Specifically, when the user puts on or removes the controller device 30, the controller-device-state detection unit 54 detects such an event and performs control for changing operation states of the proximity sensors 33 according to the detection result.

The controller-device-state detection unit 54 receives a result of detection by the mount sensor 34 to detect that the user has put on or removed the controller device 30. As described above, the mount sensor 34 is disposed at the position where the mount sensor 34 can detect the hand when the user is mounted with the controller device 30. Therefore, when the user puts on or removes the controller device 30, the result of detection by the mount sensor 34 changes.

In the case where the user removes the controller device 30, the states of the user's fingers cannot be identified by use of the results of detection by the proximity sensors 33 after the removal. If the proximity sensors 33 are continued to be operated in this case, unnecessary power consumption may occur or erroneous detection of an object such as a table on which the controller device 30 is placed as a finger of the user may occur, which is not preferable. Therefore, in the case where removal of the controller device 30 is detected, the controller-device-state detection unit 54 outputs a control command for stopping the operation of the proximity sensors 33 to the controller device 30. The control circuit 35 in the controller device 30 stops power supply to the proximity sensors 33 according to the control command, for example, to stop the operation of the proximity sensors 33. This can prevent erroneous detection by the proximity sensors 33 or unnecessary power consumption.

Alternatively, in the case where removal of the controller device 30 is detected, the controller-device-state detection unit 54 may instruct an application program being executed to suspend the process. This is because the process according to movements of the user's hand cannot be executed during a period in which the user is not mounted with the controller device 30. Specifically, the process for identifying the states of the fingers of the user by the finger state identification unit 52 is suspended, and the control of the hand object by the video display control unit 53 is also suspended.

Figure 8:
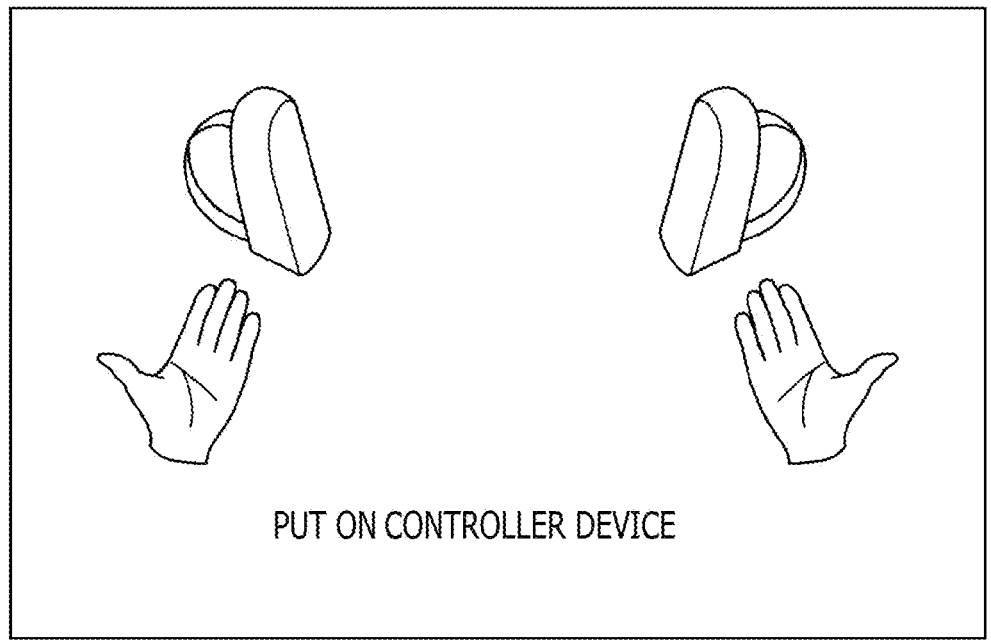
FIG. 8 is diagram illustrating an example of a message display screen.

Furthermore, in the case where the controller-device-state detection unit 54 detects removal of the controller device 30, the video display control unit 53 may display a screen indicating suspension of the process according to the instruction. Alternatively, a message prompting the user to put on the controller device 30 again may be displayed. FIG. 8 illustrates an example of such a message display screen.

In order to detect putting-on or removal of the controller device 30, the mount sensor 34 needs to be continuously operated both while the controller device 30 is mounted and while the controller device 30 is removed. In other words, the mount sensor 34 needs to be operated even during the period in which the operation of the proximity sensors 33 is stopped as described above. However, in comparison with the proximity sensors 33 used to detect the states of the fingers in real time, a frequency at which the mount sensor 34 detects presence of the hand of the user may not be so high. Therefore, the mount sensor 34 is operated at a relatively low frequency, for example, every second, so that the power consumption during the period in which the operation of the proximity sensors 33 is stopped can be suppressed.

As described above, with the information processing apparatus 10 according to the exemplary embodiment of the present invention, movements of the fingers of the user can accurately be identified regardless of an individual difference in size of the hand of the user. Further, by use of the result of detection by the mount sensor 34, the erroneous detection by the proximity sensors 33 or the unnecessary power consumption can be suppressed while the user is not mounted with the controller device 30.

Note that the exemplary embodiment of the present invention is not limited to the configuration described above. For example, in the above description, the width of the user's hand is identified by use of the results of detection by the proximity sensors 33 that are used to detect the states of the fingers of the user. However, the width of the user's hand may be identified by another method. As an example, to detect an end of the user's hand, a sensor different from the proximity sensors 33 may be disposed on the surface of the housing of the controller device 30. Alternatively, the hand width identification unit 51a may identify the width of the user's hand according to a state of the fixture 32. In a case where the user adjusts the length of the belt of the fixture 32 to mount the controller device 30 on his or her hand, it is assumed that an adjustment result of the belt reflects the size of the user's hand. Therefore, by detecting a state of the adjusted belt, the width of the user's hand can be estimated.

In the above description, the mount sensor 34 is disposed on a side, of the main body 31, facing the fixture 32. However, the mount sensor 34 may be disposed at another position. For example, the sensor for detecting the width of the user's hand, which is provided separately from the proximity sensors 33 as described above, may be used as the mount sensor 34. Alternatively, the mount sensor 34 may be disposed in the fixture 32. In any case, by disposing the mount sensor 34 at a position where the mount sensor 34 can detect presence of the user's hand, the position being different from the positions where the proximity sensors 33 are disposed, it is possible to detect whether or not the user is mounted with the controller device 30 regardless of the states of the user's fingers. Note that the mount sensor 34 is preferably disposed at such a position that erroneous detection of another object as the user's hand will not occur, in a state in which the user is not mounted with the controller device 30, for example, in a state in which the controller device 30 is placed on a desk.

Alternatively, at least a part of the processes that are executed by the information processing apparatus 10 in the above description may be executed by the control circuit 35 in the controller device 30. For example, the control circuit 35 may execute the control to stop the operation of the proximity sensors 33 according to the result of detection by the mount sensor 34 by itself, independent from the control command from the information processing apparatus 10. Alternatively, the control circuit 35 may execute the processes that are executed by the calibration processing unit 51 or the finger state identification unit 52 in the above description and transmit the result to the information processing apparatus 10.

Modification

Figure 9:
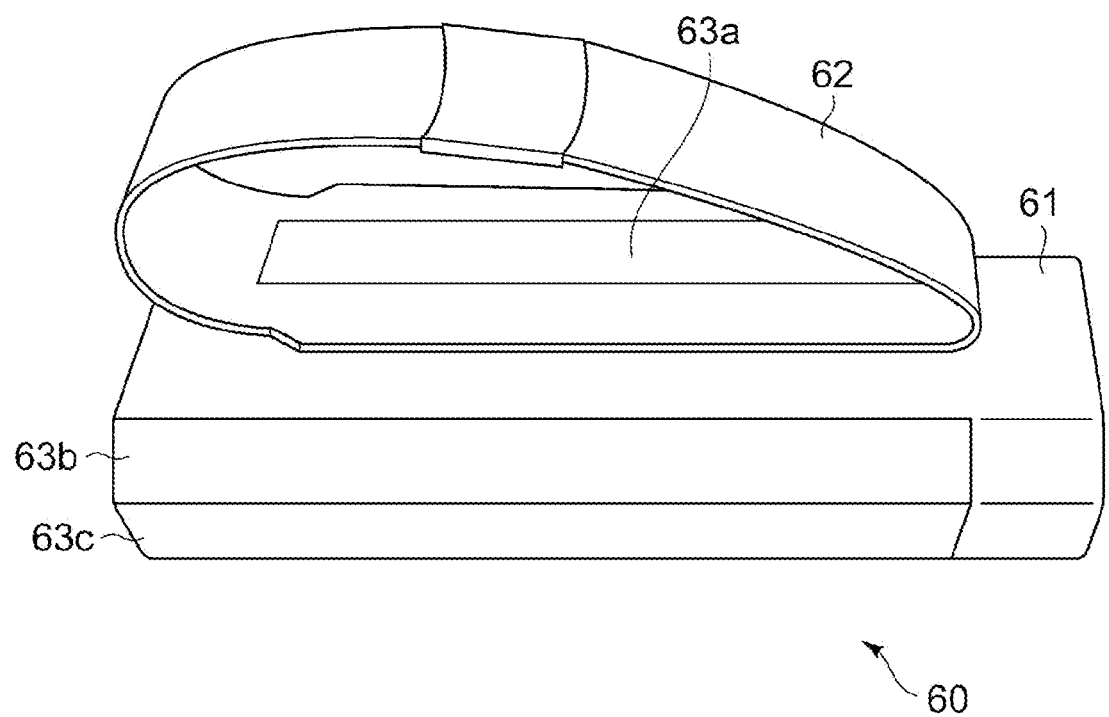
FIG. 9 is a perspective view of a rear surface side of a controller device according to a modification of the present invention.
Figure 10:
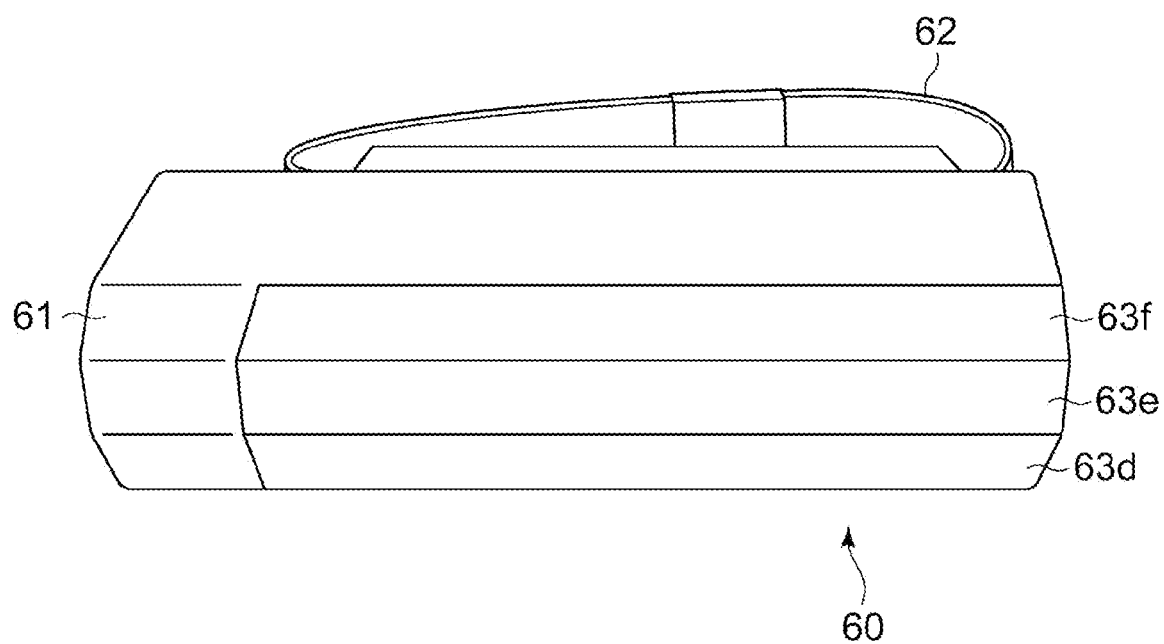
FIG. 10 is a perspective view of a front surface side of the controller device according to the modification of the present invention.

Hereinafter, a modification in which proximity sensors are disposed in a form different from the controller device 30 in the above description will be described. FIG. 9 and FIG. 10 illustrate an example of an external appearance of a controller device 60 according to the present modification. FIG. 9 illustrates a perspective view on a rear surface side, and FIG. 10 illustrates a perspective view on a front surface side. Similar to the controller device 30 illustrated in FIG. 2, the controller device 60 according to the present modification includes a main body 61 and a fixture 62, and the main body 61 has a columnar shape as a whole. Similar to the controller device 30, the user has his or her palm pass through the fixture 62 to mount the controller device 60 on the hand.

A plurality of sensor arrays 63 are disposed on a surface of the main body 61. Specifically, in the present exemplary embodiment, it is assumed that six sensor arrays 63a to 63f in total are disposed on the surface of the main body 61. Each sensor array 63 has an elongated rectangular shape, and the sensor arrays 63a to 63f are disposed along a longitudinal direction of the main body 61 while being directed so as to be parallel to each other. In other words, each sensor array 63 is disposed along the width direction of the palm when the user is mounted with the controller device 60 on his or her hand.

further, the sensor arrays 63 are disposed while being aligned along a circumferential direction of the main body 61. Particularly, five of the sensor arrays 63, that is, the sensor arrays 63b to 63f, are disposed so as to be adjacent to each other. In contrast, the sensor array 63a is disposed so as to face the fixture 62 along a position to which the fixture 62 is attached in the main body 61. With such arrangement, the sensor array 63a always faces the palm of the user in the state in which the user is mounted with the controller device 60. Further, the sensor arrays 63b to 63f are sequentially aligned at a position facing the fingers of the user's hand along an extending direction of the fingers from a palm side toward tips of the fingers of the user.

Each sensor array 63 includes a plurality of sensor elements aligned on a straight line. Each sensor element functions as a proximity sensor capable of independently detecting a position of an object. Each sensor array 63 may be an electrostatic capacitance sensor array of a self-capacitance type, for example. Hereinafter, as a specific example, each sensor array 63 is assumed to include 40 sensor elements in total. In other words, 240 detection values can be obtained by one time of measurement with 240 sensor elements in total included in the six sensor arrays 63. Note that, hereinafter, for convenience of description, it is assumed that a detection value V of each sensor element is referred to by a combination of an alphabet for identifying the sensor array 63 to which the sensor element belongs and a number of the sensor element. Herein, the number of the sensor element is assumed to be any numeral among 1 to 40 representing what numbered sensor element disposed in the sensor array 63 the sensor element is when being counted from a thumb side toward a little finger side of the user when the user is mounted with the controller device 60. For example, a value detected by a fifth sensor element counted from the thumb side in the sensor array 63a is represented as $Va5$.

In the present modification, the hand width identification unit 51*a* in the information processing apparatus 10 connected to the controller device 60 identifies the width of the user's hand by use of detection values Va1 to Va40 of the sensor array 63*a* facing the fixture 62. Specifically, for example, the hand width identification unit 51*a* estimates that positions of the sensor elements disposed at positions closest to both ends, among sensor elements by which detection values equal to or more than a predetermined threshold are detected, are positions of both ends of the user's hand. Similar to the case of the controller device 30 described above, the hand width identification unit 51*a* may identify sensor elements corresponding to both ends of the user's hand on the basis of values detected by a plurality of adjacent sensor elements.

Note that, as described above, in the state in which the palm of the user is fixed by the fixture 62, the sensor array 63*a* always faces the palm of the user. Accordingly, in the present modification, it is unnecessary to have the user perform an operation of gripping the main body 61 by his or her hand for the calibration process. Therefore, the results of detection by the sensor array 63*a* can be obtained at any timing, and the width of the hand can be identified.

Once the width of the hand is identified, the sensor assignment determination unit 51*b* can identify a correspondence relation between the sensor elements and the fingers to be detected (i.e., what numbered sensor element in each sensor array 63 corresponds to the finger to be detected) by a process similar to the case of the controller device 30 described above. As a specific example, in a case where the index finger is assumed to always be present at a position corresponding to an identical sensor element, a position of the little finger is determined from the position of the index finger and information regarding the identified width of the hand. Further, on the basis of the position of the index finger and the position of the little finger, a minimum interval between the fingers (a lower limit value of sensor elements assumed to be present between the fingers) is calculated. Then, according to the minimum interval, positions of the middle finger and the little finger are identified. As an example, in a case where the minimum interval between the fingers is calculated as five (i.e., in a case where it is estimated that at least five sensor elements are present between the fingers), it is identified that a sensor element present at a sixth position counted from the sensor element corresponding to the position of the index finger toward the little finger side corresponds to the middle finger. Further, it is identified that a sensor element present at a sixth position counted from the sensor element corresponding to the position of the little finger toward the index finger side corresponds to the ring finger.

Furthermore, in the present modification, the five sensor arrays 63*b* to 63*f* are disposed along the circumference direction of the main body 61. Therefore, it is assumed that a state of bending and stretching of each finger is identified by use of detection values detected by sensor elements having an identical number (i.e., sensor elements whose positions in the direction along the width of the user's hand coincide with each other), which are included in the respective sensor elements 63*b* to 63*f*. As a specific example, in a case where it is identified that a third sensor element counted from the thumb side corresponds to the index finger, a state of bending and stretching of the index finger is identified by use of an average value obtained by averaging detection values Vb3, Vc3, Vd3, Ve3, and Vf3 of the third sensor elements of the respective sensor arrays 63*b* to 63*f*.

In the present modification, without determining the sensor elements corresponding to the fingers to be detected by use of the result of identification by the hand width identification unit 51*a*, the positions of the fingers may be identified on the basis of the detection values themselves detected by the sensor arrays 63*b* to 63*f*. A specific example in this case will be described below.

Figure 11:
FIG. 11 is a graph illustrating examples of values detected by the controller device according to the modification of the present invention.
Figure 11:
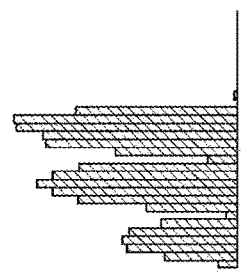
Figure 11:
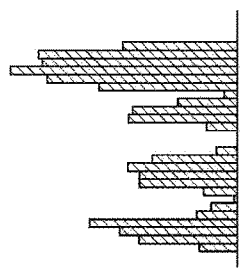
Figure 11:
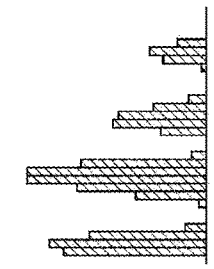
Figure 11:
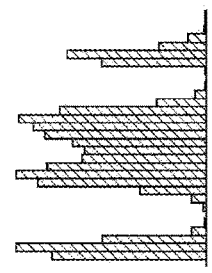
Figure 12:
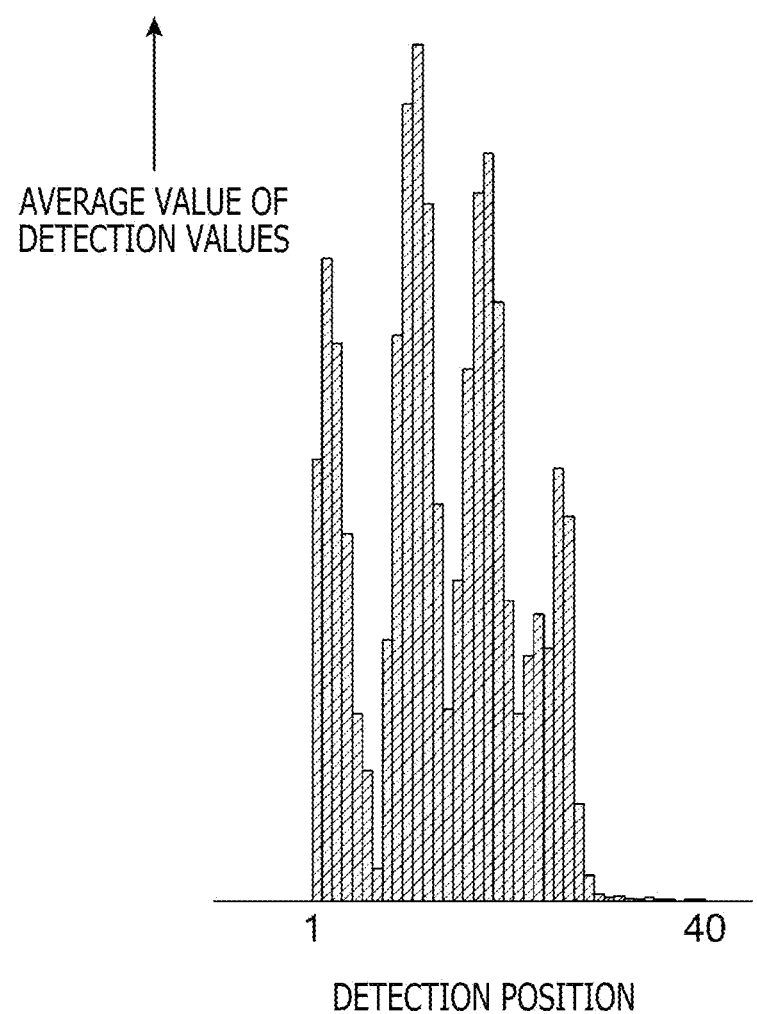
FIG. 12 is a graph illustrating examples of average values of the values detected by the controller device according to the modification of the present invention.

FIG. 11 is a graph illustrating specific examples of detection values detected by the five sensor arrays 63*b* to 63*f* at a certain timing. Further, FIG. 12 illustrates a graph of values obtained by averaging the detection values of the sensor arrays 63 for each number (i.e., for each set of sensor elements whose positions in the direction along the width of the user's hand coincide with each other). An n-th average value in the graph of FIG. 12 is an average value of n-th detection values Vbn, Vcn, Vdn, Ven, and Vfn of the respective sensor arrays 63. With such a method, the finger state identification unit 52 can identify the position and the state of bending and stretching of each finger regardless of the width of the hand.

As illustrated in the graph of FIG. 12, in the graph of the detection values of the sensor elements, four peaks appear corresponding to the fingers of the user. It is estimated that the positions of the peaks indicate the positions of the fingers of the user. Further, it is estimated that a value of each peak (an average value of the detection values at this position) indicates an amount of bending and stretching of the corresponding finger. As described above, in the case where the detection values of the plurality of sensor arrays 63 are taken into consideration, peaks of the detection values can be identified, so that the positions of the fingers of the user can be estimated from the positions of the peaks. Note that, also in this example, the sensor elements corresponding to the respective fingers may be determined by taking the minimum interval between the fingers as described above into consideration. For example, within a range in which the minimum interval between the fingers is maintained, the sensor element at a position having a largest average value may be estimated as the sensor element corresponding to one of the fingers of the user.

Further, in the case where the positions of the fingers of the user and the states of bending and stretching of the fingers are identified with the above-described method, the width of the user's hand can be identified by use of the detection values of the sensor array 63*a* obtained at the same timing. Accordingly, on the basis of a relation between the positions of the fingers of the user estimated from the width of the hand and the positions of the fingers identified by the detection values of the sensor arrays 63*b* to 63*f*, whether the fingers of the user are opened or closed can be estimated. Specifically, on the basis of the detection values of the sensor array 63*a* facing the palm, root positions of the respective fingers of the user are estimated. On the other hand, by use of the detection values of the sensor arrays 63*b* to 63*f* facing the fingers of the hand, positions of the tips of the respective fingers are estimated. On the basis of a relation between the root positions and the positions of the tips, the opening degrees (rotation angles in a direction parallel to the palm) of the respective fingers of the hand of the user can be calculated. Note that, in a case where the positions of the fingers identified by the detection values of the sensor arrays 63*b* to 63*f* are significantly deviated from the positions of the fingers estimated on the basis of the detection values of the sensor array 63*a* in an initial state, reset control may be performed, and the identification of the width of the hand based on the detection values of the sensor array 63*a* may be performed again.

Note that, in the above description, it is assumed that, by use of the average values obtained by simply averaging the detection values of all of the sensor arrays 63b to 63f facing the fingers of the user for each number, the positions and/or the states of the fingers to be detected are identified. However, the present invention is not limited thereto, and the positions and the states of the fingers may be identified by use of other statistical values such as a total value and a maximum value. Alternatively, the positions and the states of the fingers may be identified by use of values obtained by a different calculation formula such as weighted averaging using a given weighting coefficient. Alternatively, the states of the fingers may be identified by use of values obtained by some sensor arrays 63 among the plurality of sensor arrays 63b to 63f according to various conditions. Alternatively, sensor elements used to identify the positions and the states of the fingers may be limited to some of the sensor elements according to, for example, the results of detection by the sensor array 63a. For example, among the sensor elements disposed in each of the sensor arrays 63b to 63f, sensor elements used to identify the states of the fingers are limited to a specific range. Alternatively, in a case where relatively high accuracy is not required, for example, the states of the fingers of the user may be identified by use of only the results of measurement by some of the sensor elements disposed with equal intervals, for example, every second sensor element or every third sensor element.

Further, in the present modification, the sensor array 63a can be used as a mount sensor to identify whether or not the user is mounted with the controller device 60 on his or her hand. Specifically, the controller-device-state detection unit 54 obtains the detection values of the sensor elements in the sensor array 63a at a constant time interval, and when the detected values are less than a given threshold, it can be determined that the user is not mounted with the controller device 60. In a case where it is estimated that the user has removed the controller device 60, the controller-device-state detection unit 54 may output a control command for stopping the operation of the sensor arrays 63b to 63f. Further, in a case where it is determined that the user has put on the controller device 60 on the basis of the detection values of the sensor array 63a, the controller-device-state detection unit 54 outputs a control command for starting the operation of the sensor arrays 63b to 63f. This can prevent unnecessary power consumption or erroneous detection by the sensor arrays 63 during a period in which the user is not mounted with the controller device 60.

REFERENCE SIGNS LIST

1: Information processing system
10: Information processing apparatus
11: Control unit
12: Storage unit
13: Interface unit
30: Controller device
31: Main body
32: Fixture
33: Proximity sensor
34: Mount sensor
35: Control circuit
40: Display device
51: Calibration processing unit
51a: Hand width identification unit
51b: Sensor assignment determination unit
52: Finger state identification unit
53: Video display control unit
54: Controller-device-state detection unit
60: Controller device
61: Main body
62: Fixture
63: Sensor array

The invention claimed is:

1. A control apparatus for a controller device, the control apparatus controlling the controller device that is mounted on a hand of a user and includes a plurality of sensors exceeding the number of fingers of the user to be detected so as to detect bending and stretching of the fingers to be detected, the control apparatus executing a method of:
identifying a width of the hand of the user on a basis of sensors that have detected the fingers of the user among the plurality of sensors in a state in which the user grips the controller device and identifies sensors corresponding to fingers on both ends in a width direction of the hand of the user among the fingers to be detected;
determining, on a basis of information regarding the identified width of the hand, to which sensor among the plurality of sensors each of the fingers to be detected is assigned;
assigning a sensor associated with the identified sensors corresponding to the fingers on both ends in a predetermined table, to a finger to be detected other than the fingers on both ends; and
using output of the sensor assigned to each of the fingers to be detected to identify and output a state of bending and stretching of the corresponding finger.

2. The method according to claim 1, further comprising:
identifying, on a basis of the output of the sensor assigned to each of the fingers to be detected and information regarding the width of the hand, the state of bending and stretching of the corresponding finger.

3. The method according to claim 1, further comprising:
identifying, on a basis of outputs of the sensor assigned to each of the fingers to be detected and a sensor not assigned to the fingers to be detected, an opening degree of the corresponding finger in a direction intersecting a bending and stretching direction of the corresponding finger, and outputting the opening degree.

4. A control apparatus for a controller device, the control apparatus controlling the controller device that is mounted on a hand of a user and includes a plurality of first sensors that detect a state of a finger of the user and a second sensor that solely detects the hand of the user in a state in which the user is mounted with the controller device, the control apparatus executing a method of:
determining whether or not the controller device is mounted on the hand of the user according to a result of detection by the second sensor;
stopping operation of the plurality of first sensors in a case where the determination determines that the controller device is not mounted on the hand of the user; and
operating the second sensor at a lower frequency during a period in which the operation of the plurality of first sensors is stopped than during a period in which the plurality of first sensors are operated.

* * * * *